(12) United States Patent
Noh et al.

(10) Patent No.: US 9,084,190 B2
(45) Date of Patent: Jul. 14, 2015

(54) APPARATUS AND METHOD FOR INTER-VEHICLE COMMUNICATION

(71) Applicants: Hyundai Motor Company, Seoul (KR); Kia Motors Corporation, Seoul (KR); Korea University Research and Business Foundation, Seoul (KR)

(72) Inventors: Dong Gyu Noh, Dongducheon-si (KR); Jong Rok Park, Seoul (KR); Su Lyun Sung, Anyang-si (KR); Yong Tae Park, Uijeongbu-si (KR); Byung Jo Kim, Seoul (KR); Seung Nam Yang, Seoul (KR); Ji Hun Ha, Seoul (KR); Sung Heon Lim, Seoul (KR); Hyo Gon Kim, Seoul (KR)

(73) Assignees: HYUNDAI MOTOR COMPANY, Seoul (KR); KIA MOTORS CORPORATION, Seoul (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 117 days.

(21) Appl. No.: 14/056,916

(22) Filed: Oct. 17, 2013

(65) Prior Publication Data

US 2015/0018027 A1 Jan. 15, 2015

(30) Foreign Application Priority Data

Jul. 10, 2013 (KR) .................. 10-2013-0080912

(51) Int. Cl.
*H04B 7/00* (2006.01)
*H04B 15/00* (2006.01)
*H04W 56/00* (2009.01)
*H04W 84/18* (2009.01)

(52) U.S. Cl.
CPC ............ *H04W 56/001* (2013.01); *H04W 84/18* (2013.01)

(58) Field of Classification Search
USPC ........ 455/41.2, 500, 502, 507, 509, 512, 513, 455/516, 522, 68, 69, 95, 99, 344, 345
See application file for complete search history.

(56) References Cited

U.S. PATENT DOCUMENTS

| | | | | |
|---|---|---|---|---|
| 6,771,215 | B2* | 8/2004 | Akopian et al. | 342/357.63 |
| 6,865,478 | B2* | 3/2005 | Sirola et al. | 701/478 |
| 6,894,645 | B1* | 5/2005 | Akopian et al. | 342/464 |
| 7,027,772 | B2* | 4/2006 | Chen et al. | 455/41.1 |
| 7,046,168 | B2* | 5/2006 | Tsuboi | 340/903 |
| 7,286,825 | B2* | 10/2007 | Shishido et al. | 455/435.1 |

(Continued)

FOREIGN PATENT DOCUMENTS

| | | |
|---|---|---|
| JP | 2009-276845 A | 11/2009 |
| JP | 2010-011414 A | 1/2010 |

(Continued)

*Primary Examiner* — Tuan A Tran
(74) *Attorney, Agent, or Firm* — McDermott Will & Emery LLP

(57) ABSTRACT

An apparatus and a method for inter-vehicle communication includes a communicator communicating with another vehicle and a position determiner verifying position information of a vehicle, A controller is configured to synchronize a time point of transmitting/receiving a message to/from the other vehicle through a signal from the position determiner, performing a phase control for transmitting message, and transmitting the message to the other vehicle at a determined time point of transmitting the message according to the phase control result.

13 Claims, 9 Drawing Sheets

(56) References Cited

U.S. PATENT DOCUMENTS

| | | | |
|---|---|---|---|
| 7,362,265 B2* | 4/2008 | Weill | 342/357.25 |
| 7,672,270 B2* | 3/2010 | Roggero et al. | 370/328 |
| 7,876,738 B2* | 1/2011 | Akopian et al. | 370/342 |
| 8,229,663 B2* | 7/2012 | Zeng et al. | 701/301 |
| 8,520,695 B1* | 8/2013 | Rubin et al. | 370/445 |
| 8,635,013 B2* | 1/2014 | Zuccotti et al. | 701/300 |
| 8,692,705 B2* | 4/2014 | Smith et al. | 342/30 |
| 8,880,009 B2* | 11/2014 | Baldessari et al. | 455/99 |
| 8,908,516 B2* | 12/2014 | Tzamaloukas et al. | 370/232 |
| 8,922,391 B2* | 12/2014 | Rubin et al. | 340/903 |
| 8,935,094 B2* | 1/2015 | Rubin et al. | 701/517 |
| 8,995,662 B2* | 3/2015 | Rubin et al. | 380/255 |
| 2009/0290558 A1* | 11/2009 | Wermuth | 370/336 |
| 2010/0198459 A1 | 8/2010 | Kosai et al. | |
| 2011/0128849 A1 | 6/2011 | Guo | |
| 2012/0323476 A1 | 12/2012 | Funabashi | |
| 2013/0282357 A1* | 10/2013 | Rubin et al. | 703/22 |

FOREIGN PATENT DOCUMENTS

| | | |
|---|---|---|
| JP | 2010-183178 A | 8/2010 |
| JP | 2013005186 A | 1/2013 |
| JP | 2013045289 A | 3/2013 |
| KR | 2011-0088205 A | 8/2011 |

* cited by examiner

| 1 | 2 | 3 | ... | 50 |
|---|---|---|---|---|
| (54, 9) | (8, 9) | (21, 12) | ... | (150, 12) |
| (14, 6) | | (45, 9) | ... | (3, 12) |
| (101, 12) | | (123, 9) | ... | |
| (71, 9) | | | ... | ... |

Fig.4

| Data rate | Utilization weight |
|---|---|
| 6 | 2 |
| 9 | 3 |
| 12 | 4 |

Fig.5

APPARATUS AND METHOD FOR INTER-VEHICLE COMMUNICATION

CROSS-REFERENCE TO RELATED APPLICATION

This application claims the benefit under 35 U.S.C. §119(a) of Korean patent application filed in the Korean Intellectual Property Office on Jul. 10, 2013 and assigned Serial No. 2013-0080912, the entire disclosure of which is hereby incorporated by reference

TECHNICAL FIELD

The present disclosure relates to an apparatus and a method for inter-vehicle communication, and more particularly, to an apparatus and a method for inter-vehicle communication which improve communication reliability of inter-vehicle communication by determining a time point of transmitting/receiving messages using epochs, and by adjusting a data rate or a transmission power according to a communication state to transmit/receive the messages at the determined time point of transmitting/receiving the messages.

BACKGROUND

Generally, vehicle-to-vehicle communication refers to two-way communication performed between vehicles, by which the vehicles exchange information such as a traffic situation. The vehicle-to-vehicle communication can prevent accidents because vehicles exchange information such as the traffic situation so that vehicle collisions at an intersection are prevented. In such cases, it is important to maintain the efficiency of the vehicle-to-vehicle communication.

For this reason, a technology, which maintains the efficiency of the vehicle-to-vehicle communication by changing a frequency of which a vehicle transmits the information when a vehicle-to-vehicle communication state becomes congested due to a high vehicle density on the road, has been developed.

However, according to the related art, accuracy of the information received from other vehicle is degraded if a channel loss of the transmitted information is severe when there are multi-path fading and noise due to obstacles or the surrounding environment.

SUMMARY

An aspect of the present disclosure provides an apparatus and a method for inter-vehicle communication capable of preventing a collision of transmitted messages, which is generated as a number of vehicles select the same epoch by determining a time point of transmitting/receiving the messages using epochs and by applying a concept, such as a phase control, an intra-epoch, a time displacement, or the like.

According to another aspect of the present disclosure, an apparatus and a method for inter-vehicle communication adjust the data rate or transmission power according to a communication state between vehicles to transmit/receive the messages at the determined time point of transmitting/receiving the messages.

In accordance with an aspect of the present disclosure, an inter-vehicle communication apparatus includes a communicator for communicating between a first vehicle and another vehicle, a position determiner verifying position information of the first vehicle, and a controller configured of synchronizing a time point of transmitting/receiving a message to/from the other vehicle through a signal of the position determiner, performing a phase control for transmitting the message, and transmitting the message to the other vehicle at a determined time point of transmitting the message according to a phase control result.

The controller synchronizes the time point of transmitting/receiving the message using an epoch.

The controller generates an epoch map configured of information including an identification (ID) of the other vehicle, the epoch, and a data rate of the time point of transmitting the message based on the message received from a plurality of other vehicles.

The controller calculates an epoch utilization by allocating a different utilization weight to the data rate of the time point of transmitting the messages received from a plurality of other vehicles.

The controller performs the phase control for prioritizing a message having a higher data rate based on the epoch utilization.

The controller selects a final epoch according to the phase control result and disperses the time point of transmission by applying an intra-epoch to the final epoch.

The controller determines any one time point among the dispersed time point of transmission by applying a time displacement.

In accordance with another aspect of the present disclosure, a method for inter-vehicle communication includes: synchronizing, by a controller in a first vehicle, a time point of transmitting/receiving messages to/from another vehicle using a signal for the first vehicle verified by a position determiner; performing a phase control for transmitting the message; determining a time point of transmitting the message according to the phase control result; and transmitting the message to the other vehicle at the determined time point of transmitting the message.

The synchronizing of the time point of transmitting/receiving the messages to/from the other vehicle using the signal for the first vehicle includes synchronizing the time point of transmitting/receiving the message using an epoch.

In accordance with another aspect of the present disclosure, before performing the phase control, a method for inter-vehicle communication further includes verifying an epoch map configured of information including an ID of other vehicle, the epoch, and a data rate of the time point of transmitting the message based on the message received from a plurality of other vehicles.

In accordance with another aspect of the present disclosure, after verifying the epoch map, a method for inter-vehicle communication further includes calculating an epoch utilization by allocating a different utilization weight to the data rate of the time point of transmitting the message received from a plurality of the other vehicles.

The performing the phase control includes performing the phase control for prioritizing a message having a higher data rate based on the epoch utilization.

The determining the time point of transmitting the message includes: selecting a final epoch according to the phase control result and dispersing the time point of transmission by applying an intra-epoch to the final epoch; and determining any one time point among the dispersed time point of transmission by applying a time displacement to determine the time point of transmission.

BRIEF DESCRIPTION OF THE DRAWINGS

The objects, features and advantages of the present disclosure will be more apparent from the following detailed description in conjunction with the accompanying drawings.

FIG. 4 is a diagram illustrating a structure of an epoch map according to an exemplary embodiment of the present disclosure.

FIG. 5 is a diagram illustrating a calculation of epoch utilization according to an exemplary embodiment of the present disclosure.

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
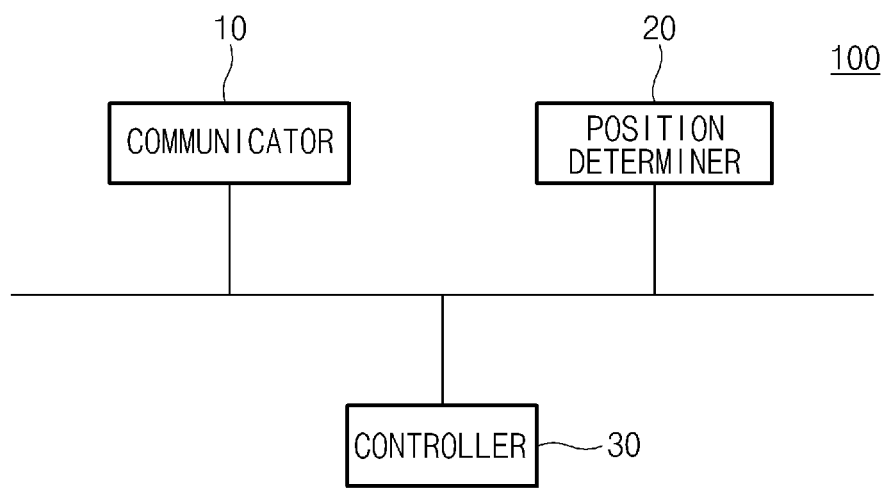
FIG. 1 is a block diagram illustrating main components of an apparatus for inter-vehicle communication according to an exemplary embodiment of the present disclosure.
Figure 2:
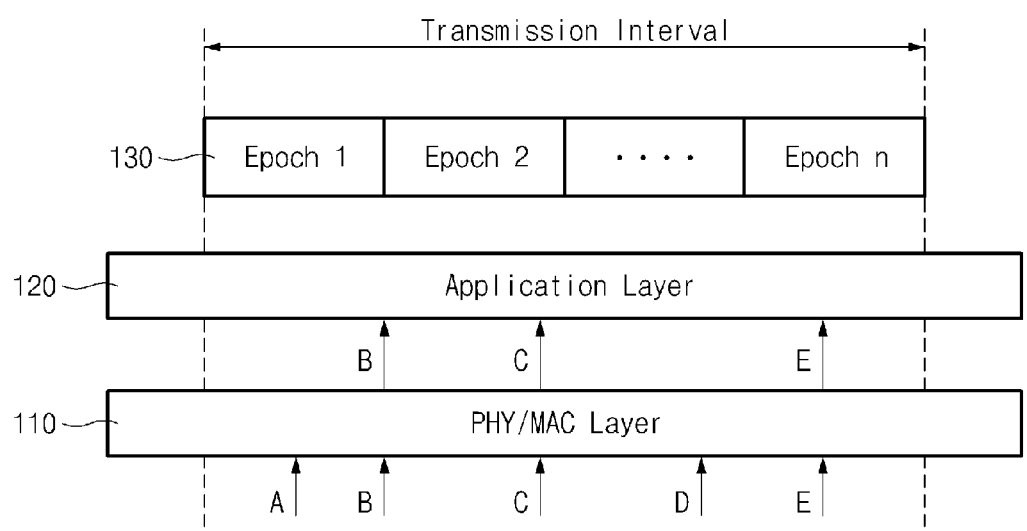
FIG. 2 is a diagram illustrating a concept of an epoch according to an exemplary embodiment of the present disclosure.
Figure 3:
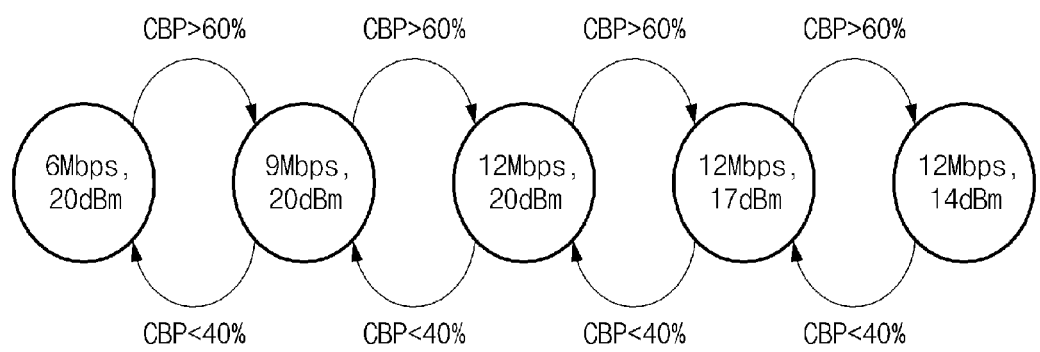
FIG. 3 is a diagram illustrating adjustment of data rate or transmission power depending on communication state according to an exemplary embodiment of the present disclosure.
Figure 5:
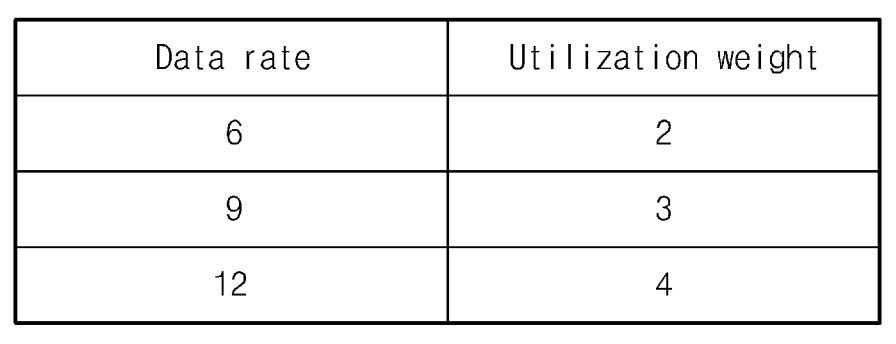
Figure 6:
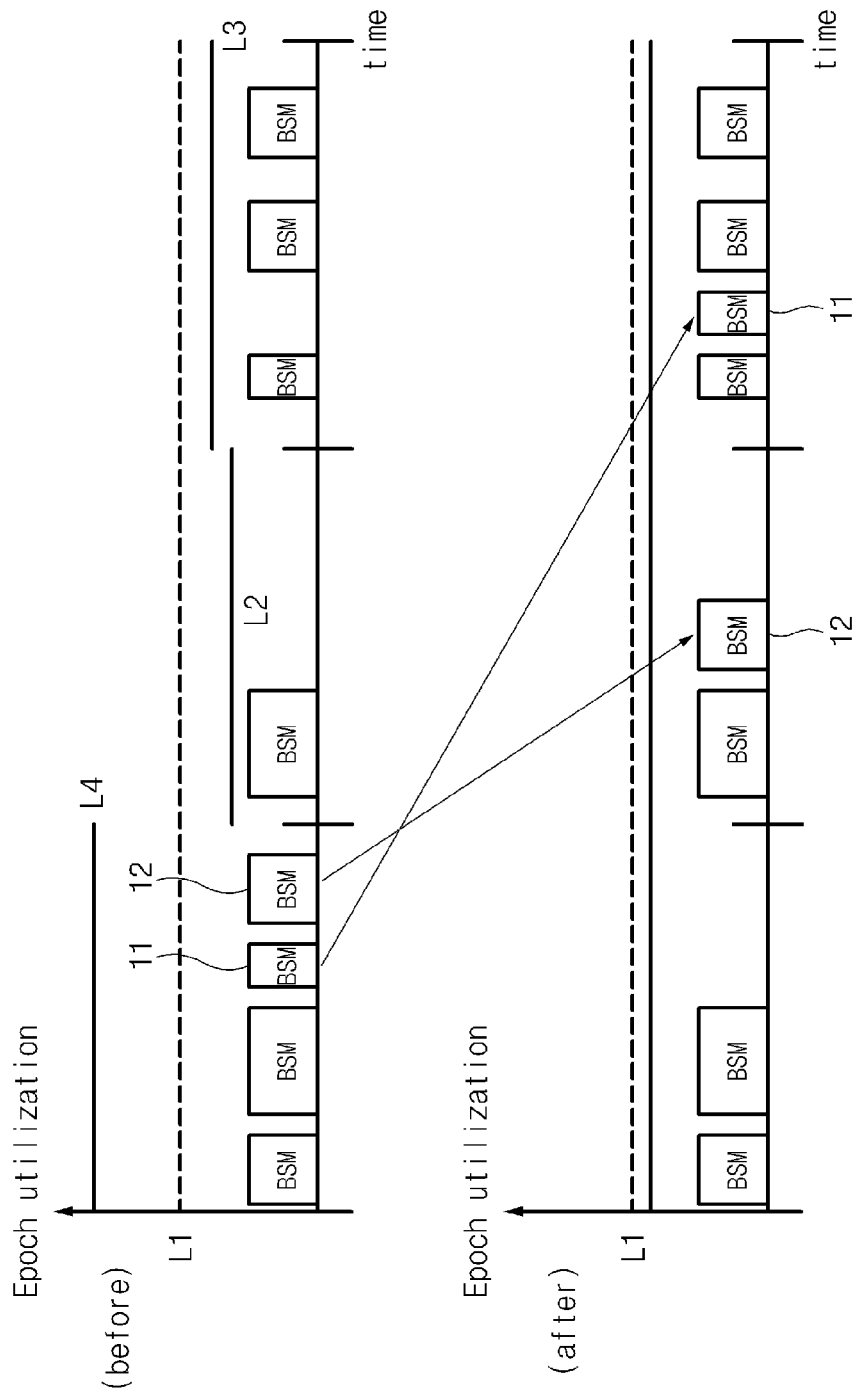
FIG. 6 is a diagram illustrating a phase control according to an exemplary embodiment of the present disclosure.
Figure 7:
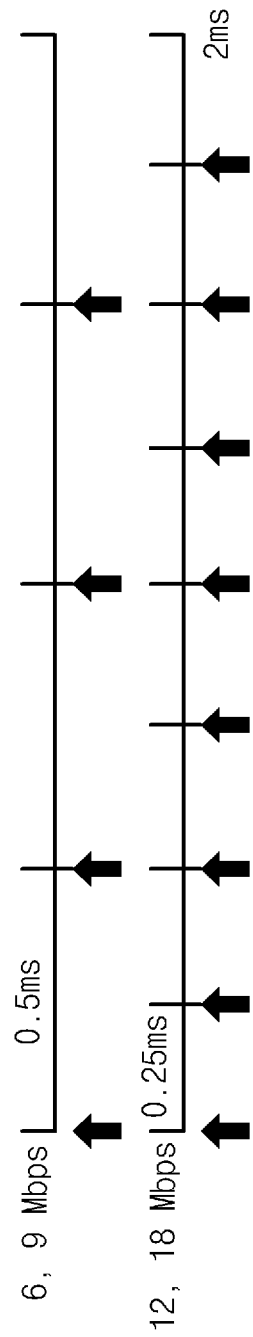
FIG. 7 is a diagram illustrating a dispersion of a time point of transmitting for each data rate according to an exemplary embodiment of the present disclosure.
Figure 8:
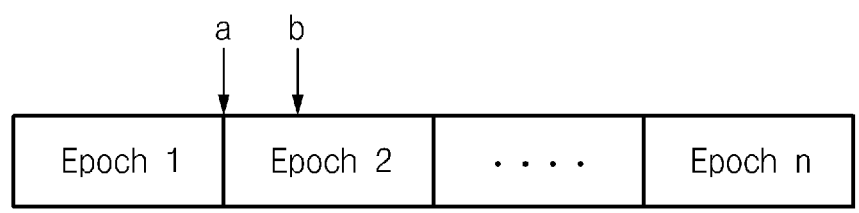
FIG. 8 is a diagram illustrating a determination of a time point of transmitting message by applying a time displacement according to an exemplary embodiment of the present disclosure.

FIG. 1 is a block diagram illustrating main components of an apparatus for inter-vehicle communication according to an embodiment of the present disclosure. FIG. 2 is a diagram illustrating a concept of an epoch according to an embodiment of the present disclosure. FIG. 3 is a diagram illustrating adjustment of data rate or transmission power depending on a communication state according to an embodiment of the present disclosure. FIG. 4 is a diagram illustrating a structure of epoch map according to an exemplary embodiment of the present disclosure. FIG. 5 is a diagram illustrating a calculation of an epoch utilization according to an exemplary embodiment of the present disclosure. FIG. 6 is a diagram illustrating a phase control according to an exemplary embodiment of the present disclosure. FIG. 7 is a diagram illustrating a dispersion of a time point of transmitting for each data rate according to an exemplary embodiment of the present disclosure. FIG. 8 is a diagram illustrating a determination of a time point of transmitting a message by applying time displacement according to an exemplary embodiment of the present disclosure.

Referring to FIGS. 1 to 8, an apparatus for inter-vehicle communication (hereinafter referred to as a communication apparatus 100) according to an exemplary embodiment of the present disclosure includes a communicator 10, a position determiner 20, and a controller 30.

The communicator 10 performs communication between vehicles. To this end, the communicator 10 may include a vehicle-to-vehicle (V2V) communication module, and transmits and receives messages to and from at least one adjacent vehicle via the V2V communication.

The position determiner 20 performs data communication with GPS satellites using the global positioning system (GPS) to calculate coordinate values for a vehicle position and acquires current position information of a corresponding vehicle based on the calculated coordinate values.

The controller 30 in the first vehicle synchronizes the time point of transmitting/receiving the message to/from another vehicle through a signal of the position determiner 20, performs a phase control for transmitting the messages, and transmits the messages to the other vehicle at the determined time point of transmitting the messages according to the phase control result.

In more detail, the controller 30 synchronizes the time point of transmitting/receiving the messages using an epoch synchronized through the signal of the position determiner 20 (hereinafter referred to as a GPS signal).

Referring to FIG. 2, an epoch refers to a unit of time used for easily managing a time point of transmitting/receiving a basic safety message (BSM, hereinafter referred to as the message) in an application layer 120 based on a coordinated universal time (UTC). Among frames A, B, C, D and E of a signal arriving at a physical/media access control (PHY/MAC) layer 110, frames A and D, which have failed to be received, are discarded in the PHY/MAC layer 110.

Frames B, C, and E unlike frames A and D, which have failed to be received, are transferred to the application layer 120 and processed in an application corresponding to the application layer 120. The transmission interval used in the application layer 120 differs for each application. When a message is transmitted, the basic frequency is 10 Hz, and the transmission interval is 100 ms. As indicated by reference numeral 130, the transmission interval is divided into several epochs. Each vehicle selects one of the epochs and determines the time point of transmitting a message to transmit the message at the time point of determination.

The controller 30 may verify the epoch in which the message is transmitted from other vehicle through the successfully received message, and thus, may verify how other vehicles are using the epochs. The controller 30 generates an epoch map by using the verified state of epoch usage to store the epoch map in a storage (not shown). Here, the epoch map will be described with reference to FIG. 4.

When the time point of transmitting/receiving the messages is synchronized, the controller 30 utilizes a channel busy percentage (CBP) of communication environment with other vehicle to measure the communication congestion. If the communication is congested, the controller 30 sets the communication condition as shown in FIG. 3. The controller 30 adjusts a data rate and transmission power using the measured results of the congestion by the CBP.

If the communication congestion exceeds 60%, the controller 30 sets the communication condition by increasing the data rate from 6 Mbps to 12 Mbps. If the controller 30 sets the communication condition by increasing the data rate, the time required for transmitting the messages is reduced, so that the communication congestion is lowered below 60%. In addition, as the time required for transmitting the messages is reduced, a hidden terminal problem (HTP) is decreased, thereby improving the rate of transmitting the messages.

On the contrary, if the communication congestion is not lowered below 60% even though the controller 30 has increased the data rate up to 12 Mbps, which is the highest data rate, the controller 30 gradually reduces the transmission power of transmitting the messages from 20 dBm to 14 dBm so that the communication congestion may be lowered below 60%.

If the communication congestion is below 40%, the controller 30 determines that there are not many vehicles that perform the communication and reduces the data rate. Here, if the controller 30 determines that the data rate being used is 12 Mbps which is the highest data rate, and the transmission power of transmitting the messages is 14 dBm which is the lowest transmission power, the controller 30 may gradually recover the transmission power to the basic transmission power of 20 dBm.

Referring to FIG. 4, after adjusting the data rate and transmission power according to the measured results of the congestion by the CBP, the controller 30 generates the epoch map by verifying how other vehicles use the epochs transmitted through the messages which are successfully received from other vehicle.

Here, an X axis indicates the number of epoch, that is 50 epochs, and y axis indicates information on the vehicle occupying each epoch. If verifying the information on the vehicle occupying the first epoch in order, it may be verified that an ID of a first vehicle occupying the first epoch is 54, the data rate of the vehicle is 9, an ID of a second vehicle occupying the first epoch is 14, the data rate of the vehicle is 6, an ID of a third vehicle occupying the first epoch is 101, the data rate of the vehicle is 12, an ID of a fourth vehicle occupying the first epoch is 71, and the data rate of the vehicle is 9.

Referring to FIG. 5, the controller 30 applies a different utilization weight to each data rate to verify that which epoch is used the most, thereby calculating the epoch utilization. Then, the controller 30 calculates the epoch utilization selected by the instant vehicle.

As shown in FIG. 6, the controller 30 performs the phase control. Each of the reference numerals L1, L2, L3, and L4 in FIG. 6 indicates each epoch utilization. L1 indicates an average value of the epoch utilization, L2 and L3 indicate the epoch utilization having a value lower than the average value, and L4 indicates the epoch utilization having a value higher than the average value.

Referring to FIG. 6 (before), four basic safety messages (BSMs) are concentrated in the L4 area, one message is positioned in the L2 area, and three messages are positioned in the L3 area. As shown in FIG. 6 (after), the controller 30 randomly moves the messages concentrated in the L4 area to the L2 and L3 areas, such that the epoch utilization of the L2, L3, and L4 area is compensated to be similar to the average. In this case, messages 11 and 12 moved to the L2 and L3 areas may have higher data rates than the messages concentrated in L4 area.

After the phase control is completed as described above, the controller 30 performs an intra-epoch according to the determined data rate. Referring to FIG. 7, each epoch is grouped according to the data rate, and the time point of transmitting is dispersed according to the data rate. More specifically, the time point of transmitting of the vehicle having the data rate of 6 Mbps or 9 Mbps may be dispersed in 0.5 ms, 1 ms, 1.5 ms, and 1.5 ms, and the time point of transmitting of the vehicle having the data rate of 12 Mbps or 18 Mbps may be dispersed in 0.25 ms, 0.5 ms, 0.75 ms, 1 ms, 1.25 ms, 1.5 ms, and 1.75 ms.

Referring to FIG. 8, the controller 30 applies the time displacement (application jitter=aSlotTime*rand[0,CWmin]) to select the time point of transmitting the message among the time point of transmission dispersed in the epoch selected by the own vehicle. For example, as shown in FIG. 8, if the first vehicle and the second vehicle select the epoch 2 as the time point of transmitting the message, a collision between the messages at the time of transmitting the message may occur. Therefore, the first vehicle applies the time displacement to determine a reference numeral a as the time point of transmitting the message, and the second vehicle applies the time displacement different from the first vehicle to determine a reference numeral b as the time point of transmitting the message. As a result, although the channel is occupied at a, which is the time point of transmitting the message of the first vehicle, the time point of transmitting the message of the second vehicle is b, thereby preventing the collision at the time of transmitting the message.

As such, the present embodiment transmits the messages using the epoch synchronized through the GPS signal while adjusting the communication congestion by the communication conditions, such that the communication congestion between vehicles can be resolved, and thus, communication reliability can be improved. The present embodiment illustrates that the data rate ranges from 6 Mbps to 12 Mbps and the transmission power ranges from 14 dBm to 20 dBm, however the present disclosure is not limited thereto.

In addition, adjusting the data rate and the transmission power depends on the CBP value, however, if it is verified that a communication channel is not congested by the CBP value, the data rate and the transmission power are not adjusted at a corresponding time point. However, in a case of the phase control, the data rate and the transmission power may be adjusted regardless of the CBP value.

Figure 9:
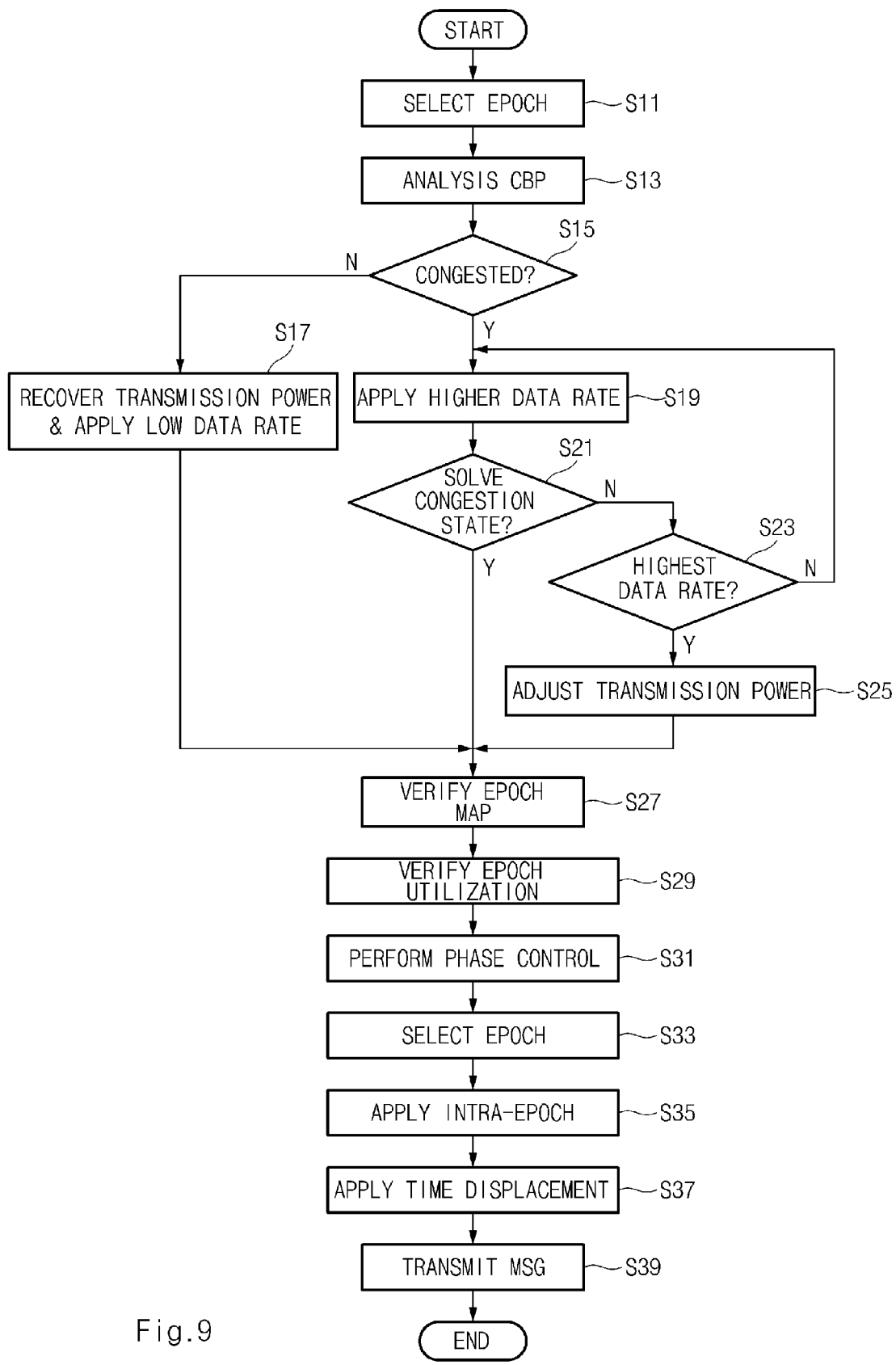
FIG. 9 is a flow chart illustrating a method for inter-vehicle communication according to an exemplary embodiment of the present disclosure.

FIG. 9 is a flow chart illustrating a method for inter-vehicle communication according to an embodiment of the present disclosure. Referring to FIG. 9, at step S11, the controller 30 of a first vehicle selects one epoch among the transmission intervals divided into the epochs, which are units of time used for easily managing the time point of transmitting/receiving the messages in the application layer 120 based on the coordinated universal time (UTC). The controller 30 synchronizes the time point of transmitting/receiving the messages based on the selected epoch.

At step S13, the controller 30 utilizes the channel busy percentage (CBP) of communication environment with another vehicle to verify the communication congestion. As a result of the verification, the controller 30 proceeds to step S19 if the communication congestion exceeds 60%, and proceeds to step S17 if the communication congestion is below 40%.

At step S17, since the communication congestion is below 40%, the controller 30 determines that there are not many vehicles performing communication, reduces the data rate, gradually recovers the transmission power for transmitting the messages into the basic transmission power, and proceeds to step S27.

On the other hand, at step S19, the controller 30 sets the communication conditions by increasing the data rate to the next higher one. The controller 30 proceeds to step 21 and determines whether the communication congestion state sensed at step S15 is solved.

As a result of the verification at step S21, if the communication congestion state is solved in step S19, the controller 30 proceeds to step S27. If the communication congestion state is not solved, the controller 30 proceeds to step S23. At step S23, the controller 30 verifies whether the data rate currently applied is the highest data rate.

As a result of verification, if the current data rate is not the highest data rate, the controller 30 proceeds to step S19 to repeat the steps described above. If it is determined that the current data rate is the highest data rate, the controller 30 proceeds to step S25 to reduce the transmission power for transmitting the messages. Here, reducing the transmission power for transmitting the messages may lower the communication congestion below 60%, and the controller 30 may solve the congestion state as described above.

At step S27, the controller 30 verifies the epoch map formed through the messages received from the other vehicle. At this time, the epoch map is a table which stores information including an ID of other vehicle, the epoch, and the data rate of the time point of transmitting the messages based on the message received from a plurality of other vehicles. The epoch map is further a table continuously accumulating and collecting the message whenever the message is received from the other vehicle.

At step S29, the controller 30 calculates the epoch utilization selected at step S11. Here, the epoch utilization is information that may verify a frequency of the epoch utilization by applying a different utilization weight to each data rate.

At step S31, the controller 30 performs the phase control based on the epoch map verified at step S27 and the epoch utilization calculated at step S29. Since a detailed description of the phase control was described in FIG. 6, it is omitted.

At step S33, the controller 30 selects the epoch by the phase control, and at step S35, the controller 30 disperses the time point of transmission by applying an intra-epoch to the selected epoch.

At step S37, the controller 30 applies the time displacement (application jitter=aSlotTime*rand[0,CWmin]). That is, the controller 30 selects the time point for transmitting the message among the time point dispersed in the epoch selected at step S11 by applying the time displacement.

Then, at step S39, the controller 30 transmits the message at a certain time point of the epoch to which the time displacement is applied.

Therefore, in the case of transmitting the message using the epoch according to the exemplary embodiment of the present disclosure, a number of vehicles select the same epoch such that a number of vehicles may simultaneously transmit the messages through the same epoch. Accordingly, the problem that a collision may occur at the time of transmitting the message may be solved. In addition, the present disclosure accepts the concept of the epoch to adjust the time point of transmitting the message, thereby preventing the unnecessary MAC collision.

In addition, the exemplary embodiment of the present disclosure determines the congestion state by the CBP and adjusts the data rate or the transmission power to reduce the CBP, thereby improving the rate of the message transmission and maintaining the low CBP.

As set forth above, the exemplary embodiment of the present disclosure determines the time point of transmitting/receiving the messages using the epochs and applies the concept, such as the phase control, intra epoch, time displacement, or the like, thereby preventing a collision generated as a number of vehicles select the same epoch when transmitting the messages.

In addition, the exemplary embodiment of the present disclosure adjusts the data rate or transmission power according to the communication state between vehicles to transmit/receive the messages at the determined time point of transmitting/receiving the messages, such that the communication congestion between the vehicles can be solved and the communication reliability is improved.

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. An inter-vehicle communication apparatus, comprising:
   a communicator for communicating between a first vehicle and another vehicle;
   a position determiner verifying position information of the first vehicle; and
   a controller synchronizing a time point of transmitting/receiving a message to/from the other vehicle through a signal of the position determiner, performing a phase control for transmitting the message, and transmitting the message to the other vehicle at a determined time point of transmitting the message according to a phase control result.

2. The apparatus according to claim 1, wherein the controller synchronizes the time point of transmitting/receiving the message using an epoch.

3. The apparatus according to claim 2, wherein the controller generates an epoch map configured of information including an ID of the other vehicle, the epoch, and a data rate of the time point of transmitting the message based on the message received from a plurality of the other vehicles.

4. The apparatus according to claim 3, wherein the controller calculates an epoch utilization by allocating a different utilization weight to the data rate of the time point of transmitting the messages received from a plurality of the other vehicles.

5. The apparatus according to claim 4, wherein the controller performs the phase control for prioritizing a message having a higher data rate based on the epoch utilization.

6. The apparatus according to claim 5, wherein the controller selects a final epoch according to the phase control result and disperses the time point of transmission by applying an intra-epoch to the final epoch.

7. The apparatus according to claim 6, wherein the controller determines any one time point among the dispersed time point of transmission by applying a time displacement.

8. A method for inter-vehicle communication, the method comprising:
   synchronizing, by a controller in a first vehicle, a time point of transmitting/receiving messages to/from another vehicle using a signal for the first vehicle verified by a position determiner;
   performing a phase control for transmitting the message;
   determining a time point of transmitting the message according to the phase control result; and
   transmitting the message to the other vehicle in the determined time point of transmitting the message.

9. The method according to claim 8, wherein synchronizing of the time point of transmitting/receiving the messages to/from other vehicle using the signal for the first vehicle comprises synchronizing the time point of transmitting/receiving the message using an epoch.

10. The method according to claim 9, before performing the phase control, further comprising verifying an epoch map configured of information including an ID of the other vehicle, the epoch, and a data rate of the time point of transmitting the message based on the message received from a plurality of the other vehicles.

11. The method according to claim 10, after verifying the epoch map, further comprising calculating an epoch utilization by allocating a different utilization weight to the data rate of the time point of transmitting the message received from a plurality of the other vehicles.

12. The method according to claim 11, wherein performing the phase control comprises performing the phase control for prioritizing a message having a higher data rate based on the epoch utilization.

13. The method according to claim 12, wherein determining the time point of transmitting the message comprises:
- selecting a final epoch according to the phase control result and dispersing the time point of transmission by applying an intra-epoch to the final epoch; and
- determining any one time point among the dispersed time point of transmission by applying a time displacement to determine the time point of transmission.

* * * * *